N. C. & E. A. SCHOLFIELD.
Corn Sheller.
No. 2,924.
Patented Jan. 20, 1843.
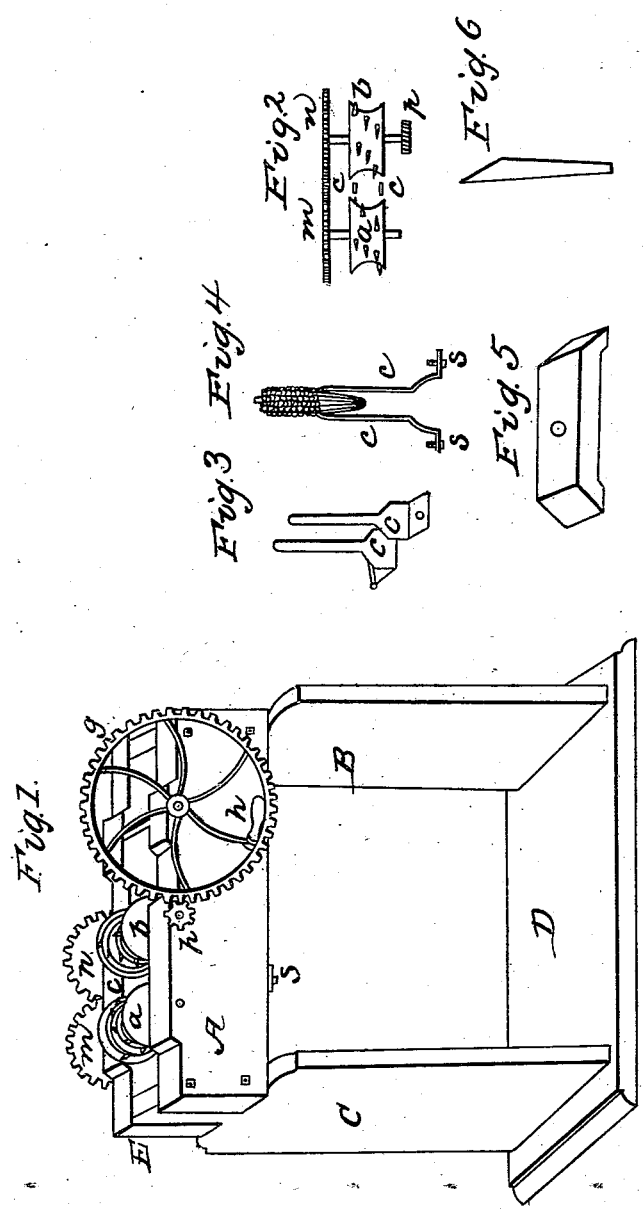

UNITED STATES PATENT OFFICE.

NATHAN SCHOLFIELD AND CHARLES SCHOLFIELD, OF NORWICH, AND EDWIN A. SCHOLFIELD, OF MONTVILLE, CONNECTICUT.

CORN-SHELLER.

Specification of Letters Patent No. 2,924, dated January 20, 1843.

*To all whom it may concern:*

Be it known that we, NATHAN SCHOLFIELD and CHARLES SCHOLFIELD, of Norwich, New London county, in the State of Connecticut, and EDWIN A. SCHOLFIELD, of Montville, in said county, have invented a new and useful Improvement in the Art of Shelling Corn from the Ear, and that the following is a full and exact description of the machine and mode of operation as invented by us.

The peculiarities of our improvement consists in causing the ear of corn to pass between two rollers whose surfaces are grooved or hollowed and so set as to form a circular space between them through which the ears of corn may pass, each of the rollers being grooved or hollowed so that a section of its concave surface may form about one third of the circumference of a circle and they are set at sufficient distance from each other to allow a spring or clasp on each side between them, to hold the ear from passing through too rapidly, and to scrape the corn from the sides of the ear with which they are in contact while teeth properly set in the concave surface of the rollers tear the corn from the opposite sides, and carry the cob through between them as they revolve.

The following is a more special description of the construction of the machine viz A, B, C, D, E is the frame, the two pieces A and E are of plank about 2 feet long 5 inches wide and 1¼ or 1½ inches thick.

The pieces B and C are 1½ or 2 inches thick 2 feet high to the shoulders, and about 10 or 11 inches wide, the bottom piece D, is of plank, of suitable dimensions to support the machine.

*a* and *b* Figure 1 are the two grooved rollers, of about 5 inches in diameter on the edges and about 2 or 2½ inches thick their surfaces are hollowed out so as to form nearly a circular space between them when set about three-fourths of an inch apart; their hollowed surfaces are set with steel points or teeth, projecting out about half an inch, we put in 12 or 16 teeth in each roller, the rollers are connected by the gears *m* and *n* filed on the shafts with them and by which they are made to revolve together when in operation.

Fig. 2 represents a view of the rollers, and gears by which they are connected, as seen from the top of the machine.

Fig. 6 is the form of the teeth before being set in the rollers.

*p* Fig. 1 is a pinion on the shaft with the roller *b* which works in the gear *g* by which the machine is put in operation, the operator turning at the handle *h*.

*c* and *c* are the two clasps or springs the upper parts of which only are visible. They are fastened at the bottoms of the pieces A and E by the screw *s*.

*c, c,* Fig. 2 represents the upper end of them as they stand in reference to the rollers from a top view.

Fig. 3 represents them as they stand according to the position of the machine in Fig. 1.

Fig. 4 represents them by a side view clasping the cob as it has passed partly through. They are about one-half or three-fourths of an inch wide at the top and gradually widening toward the bottom, but near the bottom widening suddenly so as to be 1½ or 2 inches wide, in order to give them a firm bearing by which to fasten them to the frame. They are something less than one-eighth of an inch in thickness. They are made so as to spring, to accommodate themselves to the size of the cob. The shaft on which the roller *a* is placed may be set in boxes or bearings so fitted as to slide off or on, but to be pressed up by a spring to keep it in its natural position, so that it will receive and shell ears of a considerable difference in size.

Fig. 5 is a box or cover made to fit over the rollers, through a hole in the top of which the ears of corn are introduced to be shelled.

The mode of operation is, while the machine is in motion, to put the ears of corn in through the hole between the rollers, the small end forward, when they are received by the rollers and clasps and carried through instantly and pass off completely shelled.

What we claim as new and for which we ask Letters Patent, is—

The two rollers as above described and in connection therewith the clasps or springs for the purpose specified.

NATHAN SCHOLFIELD.
CHARLES SCHOLFIELD.
EDWIN A. SCHOLFIELD.

Witnesses:
MARTIN THOMPSON,
ERASTUS C. HEQWIN.